United States Patent [19]

Kellner

[11] Patent Number: 5,404,226
[45] Date of Patent: Apr. 4, 1995

[54] PROCESS FOR DETERMINING THE POSITION OF A POSITIONING BODY IN RELATION TO A REFERENCE BODY AND DEVICE FOR IMPLEMENTING THE PROCESS

[75] Inventor: Helmut Kellner, Moormerland, Germany

[73] Assignee: E.M.S. Technik GmbH, Leer, Germany

[21] Appl. No.: 98,366

[22] PCT Filed: Feb. 11, 1992

[86] PCT No.: PCT/DE92/00101

§ 371 Date: Aug. 29, 1993

§ 102(e) Date: Aug. 29, 1993

[87] PCT Pub. No.: WO92/14117

PCT Pub. Date: Aug. 20, 1992

[30] Foreign Application Priority Data

Feb. 12, 1991 [DE] Germany .................. 41 04 602.1

[51] Int. Cl.⁶ .............................................. G01B 11/14
[52] U.S. Cl. .................................. 356/373; 33/707
[58] Field of Search .............................. 356/373, 374; 250/237 G; 33/707

[56] References Cited

U.S. PATENT DOCUMENTS

| 3,600,811 | 8/1971 | Weyrauch | 33/707 |
| 4,673,810 | 6/1987 | Babsch et al. | 250/237 G |
| 4,673,817 | 6/1987 | Oomen | 356/376 |
| 4,843,237 | 6/1989 | Michel | 356/373 |
| 4,951,399 | 8/1990 | Ernst | 356/374 |
| 5,007,177 | 4/1991 | Rieder et al. | 33/707 |
| 5,010,655 | 4/1991 | Rider et al. | 356/373 |
| 5,017,013 | 5/1991 | Kellner | 356/373 |
| 5,038,491 | 8/1991 | Tsukiji et al. | 33/707 |
| 5,253,531 | 10/1993 | Walker et al. | 356/374 |

FOREIGN PATENT DOCUMENTS

| 0135673 | 4/1985 | European Pat. Off. . |
| 0163347 | 12/1985 | European Pat. Off. . |
| 3427067 | 2/1985 | Germany . |
| 3840726 | 6/1990 | Germany . |
| 3909856 | 10/1990 | Germany . |

OTHER PUBLICATIONS

Francoise M. Depasse et al., "Modeling of the Field Transfer Through Thick Dielectric Lines: Use in Linewidth Measurement", Applied Optics, vol. 30, No. 11, pp. 1355-1360, Apr. 10, 1991.

Gottfried Konecny et al., "Photogrammetrie," 4th edition, Walter de Gruyter, Berlin—New York, 1984, pp. 48-55.

Primary Examiner—Richard A. Rosenberger
Assistant Examiner—Jason D. Eisenberg
Attorney, Agent, or Firm—Burns, Doane, Swecker & Mathis

[57] ABSTRACT

The description relates to a process for determining the position of a positioning body in relation to a reference body in which the positioning body has a scale with markings at constant distances and the reference body has a scanner with a projection surface on which the markings of the scale are projected by imaging optics. The coordinates of the projection center of the imaging optics are trigonometrically calculated from the projection angles between the projection center and three markings arranged on the scale and from the constant distance between the markings. In addition, the angle of inclination of the positioning body in relation to the reference body is trigonometrically calculated via the co-ordinates found for the projection center, the distance between the projection center from the projection surface of the scanner and the image co-ordinates of the base of the vertical position of the position center above the projection surface.

17 Claims, 4 Drawing Sheets

PROCESS FOR DETERMINING THE POSITION OF A POSITIONING BODY IN RELATION TO A REFERENCE BODY AND DEVICE FOR IMPLEMENTING THE PROCESS

BACKGROUND OF THE INVENTION

The invention relates to a process for determining the position of a positioning body relative to a reference body wherein the positioning body has a scale with marks of constant distances and the, reference body has a scanner onto which the marks of the scale are projected, and devices to implement the respective process.

Such methods serve, e.g., to acquire during the control of measurement and production machines the distances between longitudinally moveable objects such as measuring heads, gripping arms or assembling arms. In so doing, the accuracy with which these distances can be determined is a decisive factor for the machining accuracy of the automatic device.

A process, which enables high accuracy of measurement independently of an exact guide of the scanner, is already known from the DE-OS 39 09 856. At the same time three marks of a scale are evaluated by a scanner. With two marks the angle of projection formed between a projection center and these marks would still depend on how far the center of projection is above the marks and how far it is moved sideways. With three marks it is possible to exactly determine the center of the projection by way of another angle of projection formed between the center of projection, the third mark and one of the other two marks. For a combination of two angles there exists only one place where the center of projection can be located.

Furthermore, it is well-known from the book by G. Konecny and G. Lehmann: Photogrammetry, 4th edition, de Gruyter, Berlin, N.Y., 1984, pp. 48–55, to utilize a projective relationship to determine the coordinates and to consider a tilt angle between a projection area and a pre-image plane.

SUMMARY OF THE INVENTION

The present invention is based on the problem of not only acquiring measurements of the position of a positioning body relative to a reference body in the direction of a scale axis and vertically thereto but also the tilt angle between the positioning body and the reference body. This problem is solved by a process, and a device to carry out the process, to determine the position of a positioning body relative to a reference body, wherein the positioning body includes a scale having marks of constant spacing therebetween and wherein the reference body includes a scanner with a projection area onto which the marks of the scale are projected and imaging optics, the process comprising the steps of trigonometrically calculating coordinates of a projection center of the imaging optics from projection angles between the projection center and three marks, arranged on the scale, and from the constant spacing of the marks, and trigonometrically calculating a tilt angle of the positioning body with respect to the reference body, the tilt angle calculating step including determining coordinates of the projection center, determining distance of the projection center from the projection area of the scanner, and determining image coordinates of a plumb line base point of the projection center on the project area.

In a first alternative, the coordinates are determined first in the longitudinal direction of the scale and then the coordinates that note the distance from the scale. Subsequently these variables are evaluated in connection with the chamber constants, i.e. the distance between the projection center and the projection area of the scanner and the plumb line base point of the projection center on the projection area, the results of which are finally the tilt angle.

The tilt angle can be calculated in a simple manner with the concrete formula of calculation so that one can make do with a single scanner in order to determine three degrees of freedom. A second, alternative embodiment is a process to determine the position of a positioning body relative to a reference body, wherein the positioning body includes a scale with marks of constant spacing and the reference body includes a scanner with a projection area, onto which the marks of the scale are projected, and imaging optics, the process comprising the steps of trigonometrically calculating coordinates of the projection center of the imaging optics by evaluating at least three marks arranged on the scale, and calculating a tilt angle of the positioning body with respect to the reference body, the tilt angle calculating step is performed by way of a projective relationship between a projection plane of the scanner and a plane of the scale.

As in the first alternative, it is necessary to reproduce at least three marks for the calculation. In this case three linear equations with three unknowns are obtained. When more than three marks are acquired, the transformation constants are determined by calculation of equations. In this manner the accuracy is significantly increased.

Another embodiment provides that there are two scales arranged in one plane, and one scanner is assigned to each of these scales.

In addition to an embodiment with only one scale and one scanner, one angle of rotation can also be determined vertically and one can be determined parallel to the plane in which the scales lie. This determination is done by forming the differences of the coordinates in the longitudinal direction of the scale or at a distance from the scale while taking into consideration the reciprocal distances of the projection centers.

In another embodiment it is provided that the scales form an angle of preferably 90° at the positioning body or reference body, and one scanner is also assigned to each of the two scales.

This embodiment makes it possible to acquire the coordinates in three coordinate directions and to specify two angles of rotation.

Finally, a combination provides that two parallel scales are arranged in one plane and another scale is arranged at an angle to this plane. Here, too, one scanner is assigned to each of the three scales.

In this arrangement it: is possible to note not only all three coordinate directions but also all angles of rotation around these coordinate directions. Thus, the spatial position of a positioning body relative to a reference body can be exactly noted in all six degrees of freedom.

With regard to the design of the scales there are two alternatives. In a first alternative the scales are designed as incremental scales. The coordinates pointing in the direction of the scale can be roughly determined by a mark counter.

A second alternative provides that the scales are designed as absolute scales. In this case the coordinates pointing in the direction of the scale are roughly determined by a decoder. The decoder decodes the co)ordinate values that are encoded in the marks, so that there is no need to count the marks that have been passed.

Other improvements and advantageous embodiments of the process and the device follow from the claims, the further description and the drawings, with the aid of which the invention is explained in detail.

DESCRIPTION OF THE PREFERRED EMBODIMENTS

Figure 1:
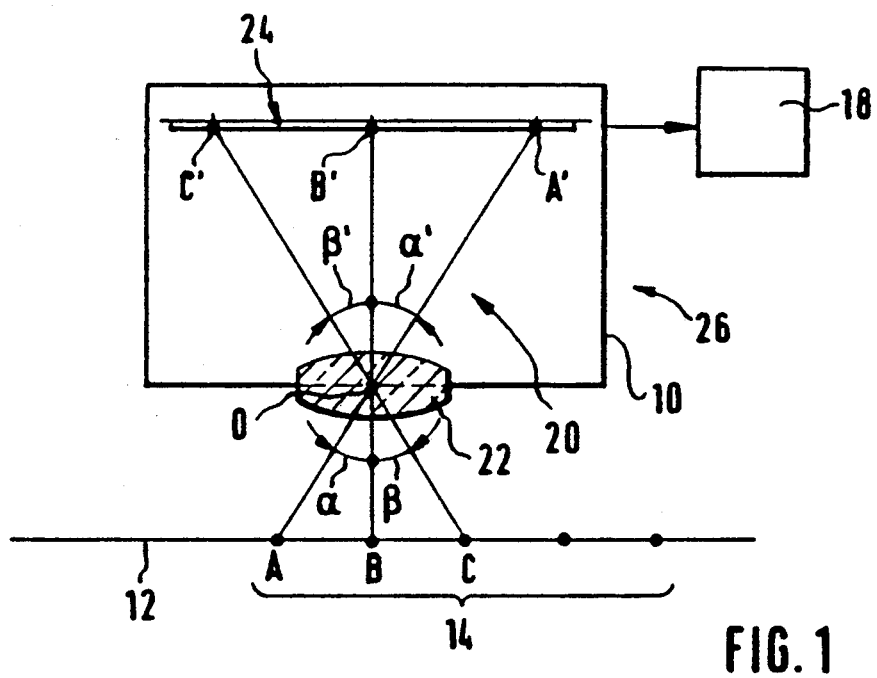
FIG. 1 is a diagrammatic side view of a scanner above a scale.

FIG. 1 is a diagrammatic side view of a scanner 10. It includes a scale 12 with marks 14, of which individual marks are labelled here A, B and C. If the scale 12 is an incremental scale, then the coordinates in the longitudinal direction of the scale can be roughly determined by counting the marks 14. In another alternative embodiment in which an absolute scale is used, the marks already contain (through coding) coarse coordinate information in the longitudinal direction of the scale. This coding can be done, e.g. by means of different thicknesses of the line, optionally in connection with a binary method of representation.

The scanner 10 is designed as an optical scanner and includes imaging optics 22 with a projection area 24 and a measuring device 26. At this scanner 10 a projection center O is formed by means of the projection center of the imaging optics 22. The projection area 24 is formed by means of a diode array, e.g. in the form of a CCD line. The number of pixels is chosen in such a manner that, in the case of an absolute scale, the width of the marks 14 can be determined using an appropriate resolution of the projected image of the marks on the pixels and the marks can be decoded with the aid of a computer 18.

To calculate the coordinates in the longitudinal direction and at a distance from the scale 12, the marks A, B, and C, which assume the angle $\alpha$ or $\beta$ relative to the center of projection, are evaluated here. These marks are reproduced at the angle $\alpha'$ and $\beta'$ on the points A', B' and C' of the projection area 24. If the projection area 24 is a CCD line, then charge changes, which are recorded following serial read out and which can be converted into corresponding angles $\alpha$ and $\beta$ by the computer 18, are brought about at the places where the marks are reproduced on this line. Using trigonometric functions, the coordinates of the projection center O can be determined from the projection angles $\alpha$ and $\beta$.

Figure 2:
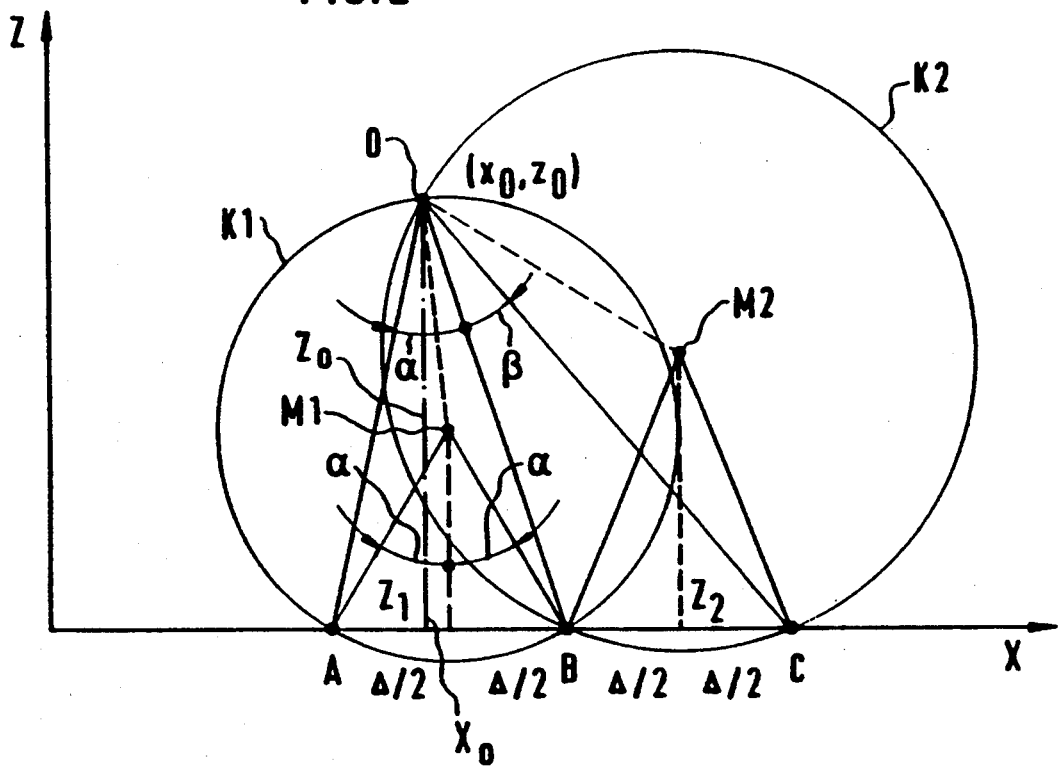
FIG. 2 is a geometric drawing of the projection angles to elucidate the formulas of calculation for the coordinates in the longitudinal direction and at a distance from the scale.

To explain the arithmetic steps, reference is made to FIG. 2, where the further view is restricted to the marks A, B, and C and the center of projection O. In this case the projection center O is not located directly above the mark B in order to show with respect to the drawing that any arbitrary position of the projection center O can be determined.

The projection angle $\alpha$ is enclosed between the projection center O and the marks A and B; and the projection angle $\beta$ is enclosed between the projection center O and the marks B and C. The distances between the marks A, B and C are $\Delta$ respectively. If the angles $\alpha$ and $\beta$ are regarded by themselves, the results are different points that assume the same projection angle $\alpha$ and $\beta$. These points are located on a locus curve, which is represented for angle $\alpha$ by a circle K1 and for the angle $\beta$ by a circle K2. If the two angles $\alpha$ and $\beta$ are combined, then the result is only one real point, where the condition is fulfilled.

This point is noted by the intersections of the two locus curves, thus the circles K1 and K2. The center points M1 and M2 of the circles K1 and K2 can be determined in such a manner that the mid-perpendicular between the marks A and B, on the one hand, and B and C, on the other hand, are determined and here the intersections with lines that run through the marks A and B or B and C at the projection angle, thus $\alpha$ or $\beta$, can be obtained.

For the distances of the mid-points M1 and M2 from the axis of the scale, thus the Z coordinate of the center points M1 and M2, the results are:

$$Z1 = \frac{\Delta}{2 * \tan \alpha} \text{ and } Z2 = \frac{\Delta}{2 * \tan \beta}$$

With mathematical derivations the results are for:

$$x_0 = \frac{\Delta * (Z1^2 - Z2^2)}{(Z1 - Z2)^2 + \Delta^2}$$

and for $$z_0 = \frac{\Delta^2 * (Z1 - Z2)}{(Z1 - Z2)^2 + \Delta^2}$$

Thus, these equations, lead to an unequivocal solution and can be determined with the conventional computers within a minimum period of time. In the case of several scanners A1, A2, A3 they apply to all scanners. To be able to produce subsequently a reference to the respective scanner, the variables in the equations are provide, d additionally with indices that correspond to the ordinal number of the scanners. Thus, with three scanners the indices 1, 2 and 3 are issued.

Figure 3:
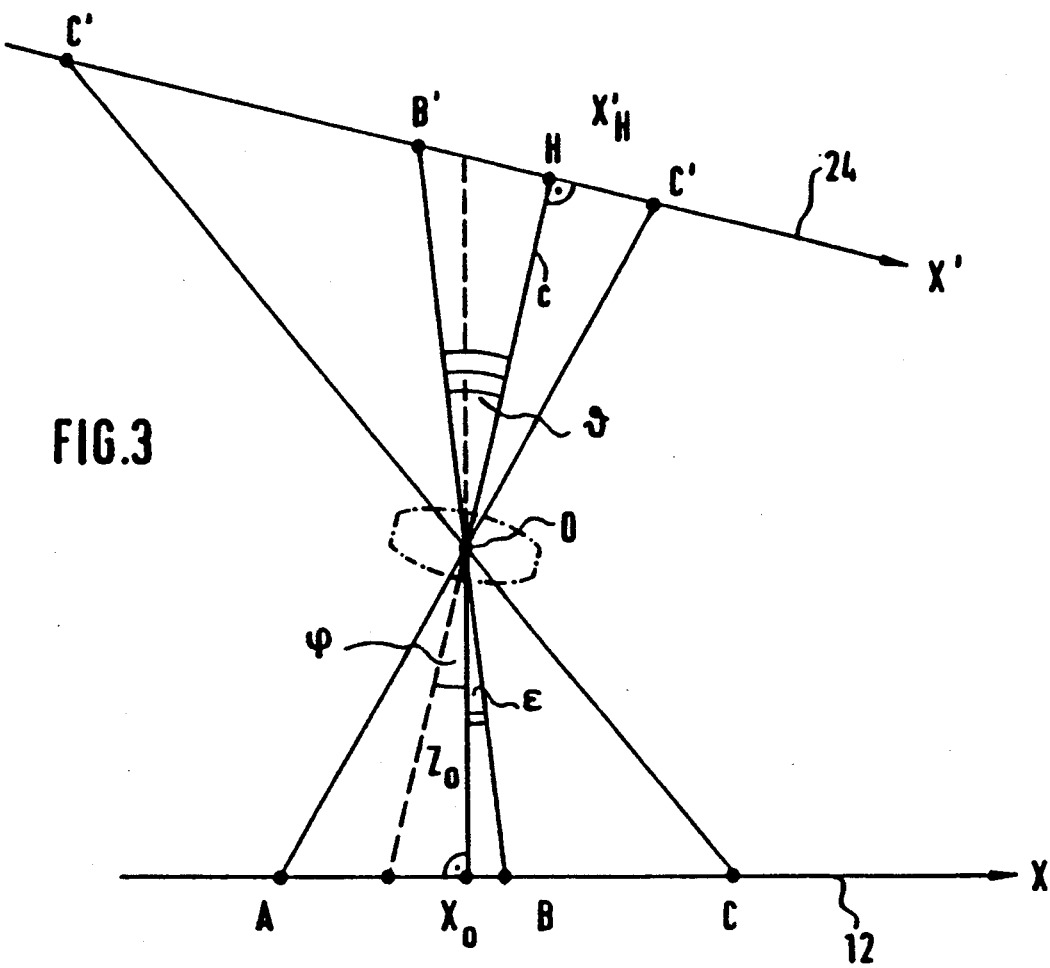
FIG. 3 is another geometric drawing to explain the formulas of calculation to determine the tilt angle.

At this stage the calculation of the tilt angle $\phi$ is explained with reference to the, drawing in FIG. 3. There the projection area 24 is sloped relative to the plane of the scale 12. Again the marks A, B and C are located on the scale 12; and the marks reproduced on the projection area 24 are labelled A', B' and C', The distance between the projection center O and the projection area 24 is denoted as c, where here the shortest distance to the main point H is drawn in. In addition, the angles of rotation $\phi$ are shown between the perpendicular of the projection center O on the scale 12 and the perpendicular of the projection center O on the projection plane 24; E is shown between the perpendicular of the projection center O on the scale 12 and the connection between the projection center O and the mark B; and $\phi$ is shown between the perpendicular of the projection center O on the projection area 24 and the connection between the projection center O and the projected mark B'. The result for the angle of rotation $\epsilon$ is:

$$\epsilon = \arctan \frac{X_{Mi} - X_{0i}}{Z_{0i}}$$

and for the angle of rotation $\phi$:

$$\theta = \arctan \frac{X'_{Mi} - X'_H}{c}$$

In addition, $\phi = \tau - \epsilon$

Another method of calculation is based on the projection relationship between the plane of the scale and the plane of the projection, which has the following mathematical form:

$$a_1 = \frac{c}{Z_0 - X_0 * \tan \phi}$$

X' denotes the coordinates of the image on the projection area 24, embodied by the pixel addresses of a CCD line; and X denotes the coordinates of the scale marks M. The variables a1, a2 and a3 form the transformation constants that can be noted mathematically as follows:

$$a_1 = \frac{c}{Z_0 - X_0 * \tan \varphi}$$

$$a_2 = -\frac{c}{Z_0 - X_0 * \tan \varphi} * (X_0 + Z_0 * \tan \varphi)$$

$$a_3 = \tan \varphi * \frac{1}{Z_0 - X_0 * \tan \varphi}$$

To be able to specify unequivocally the three transformation constants, the evaluation of the three marks is necessary. An equation system comprising three equations with three unknowns is obtained; after solving, said system makes it possible to specify unequivocally the transformation constants. First, the angle of rotation $\phi$ is obtained from these equations as:

$$\phi = \arctan(c*(a_3/a_1)),$$

the coordinate $X_O$ as:

$$X_0 = -\frac{a_2 + c * \tan \phi}{a_1 * (1 + \tan^2 \phi)}$$

and the coordinate $Z_O$ as:

$$Z_0 = \frac{c}{a_1} + X_0 * \tan \phi$$

Both methods for determining the coordinates and the tilt angle are equivalent, so that with the existing scanners and scales the one or the other method can be applied as desired; and in so doing, the result is the same.

Figure 4:
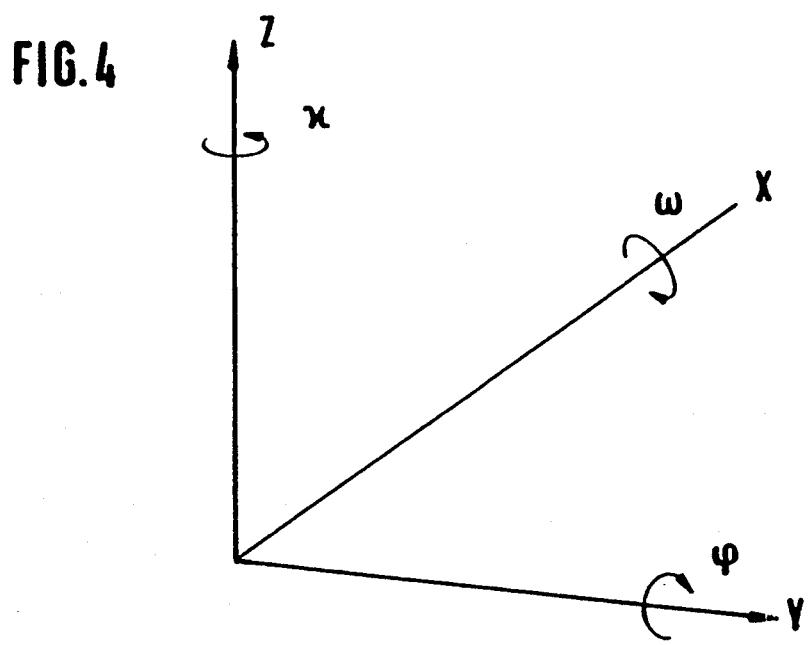
FIG. 4 depicts the coordinate system to define the labels and parameters that are used.

FIG. 4 shows a coordinate system to define the labels and parameters that are used. The parameters that are defined here are also used in FIGS. 5, 6 and 7. It is a cartesian coordinate system with the axes of the coordinates X, Y and Z. $\phi$ denotes the angle of rotation around the Y axis; $\eta$ denotes the angle of rotation around the Z axis; and $\omega$, the angle of rotation around the X axis.

Figure 5:
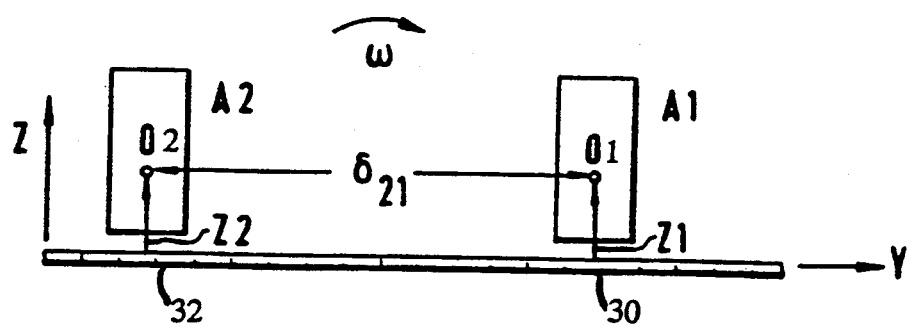
FIG. 5 is a schematic side view of a second scanner above a scale.

FIG. 5 is a diagrammatic side view of two scanners A1 and A2 above the scales 30 and 32. The projection centers $O_1$ and $O_2$ have a reciprocal distance $\delta$. If a straight line, extending through the projection centers $O_1$ and $O_2$, runs parallel to the plane in which the scales lie, then the two distances between the projection centers are also equal. For deviations one can calculate the angle of rotation by way of the tangent or arc tangent function in connection with the distance $\delta$, and in particular according to the general formula:

$$\omega = \arctan \frac{Z_{02} - Z_{01}}{\delta_{21}}$$

Figure 6:
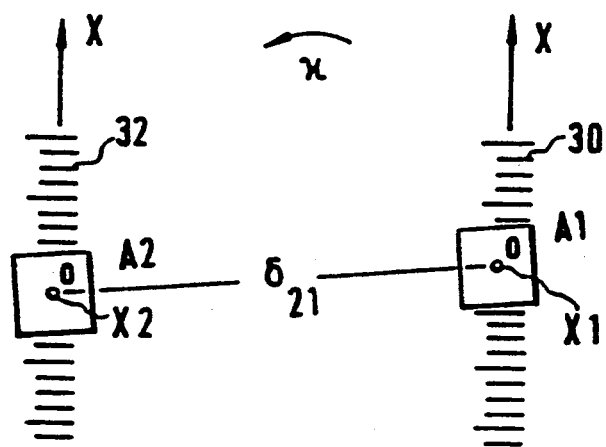
FIG. 6 is a schematic top view of two scanners above two scales.

This formula can be applied both to determining the angle of rotation $\eta$ and to determining the angle or rotation $\omega$, where, however, in the one case the difference of the coordinates in the Z direction must be inserted and in the other case the difference of the coordinates in the X direction must be inserted. The latter case is shown in FIG. 6.

Figure 7:
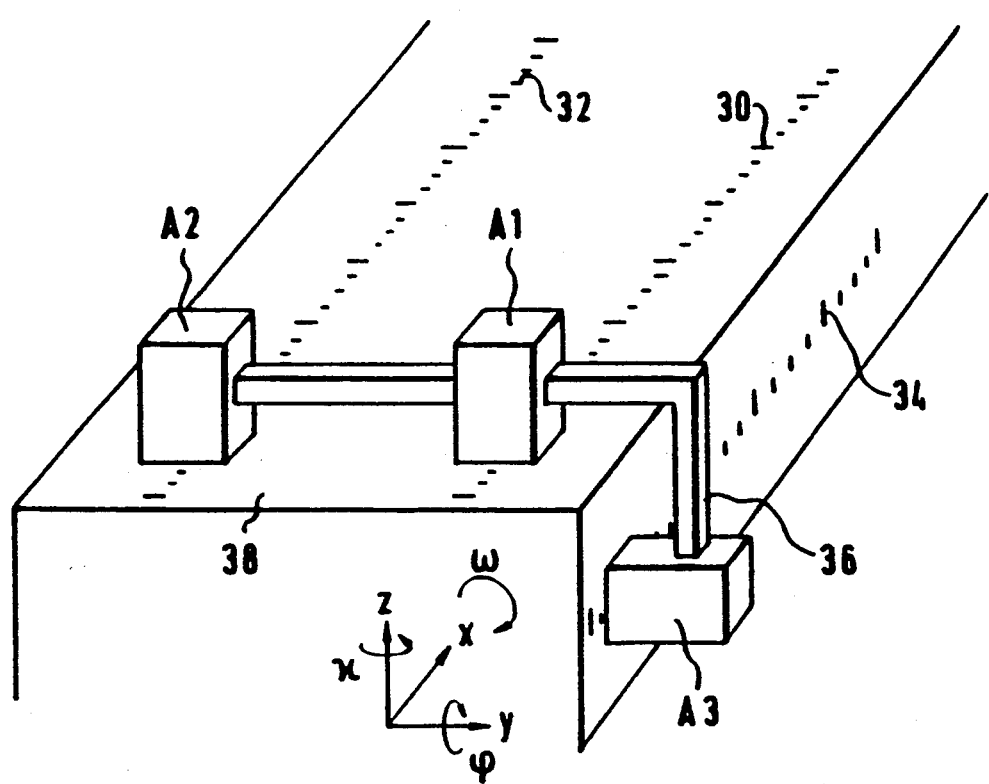
FIG. 7 is a perspective view of a positioning body with scales and scanners to acquire all spatial parameters.

FIG. 7 shows a positioning body 36 with three scales 30, 32 and 34 and three scanners A1, A2, and A3 on a reference body 38. A first 30 and a second scale 32 are located on the wide side of the reference body 38. A third scale 34 is arranged on the narrow side of the reference body 38. The narrow side and the wide side of the reference body 38 are oriented at an angle of 90'. The exact position of the positioning body 36 with respect to the reference body 38 can be determined with the aid of the scan values determined by the scanners. In principle the data of each of the three scanners $A_1$, $A_2$, $A_3$ are suitable for determining the X direction. They agree with respect to the X direction, so that the result of an arbitrary scanner can be used. Here the scanner A1 is evaluated. The X coordinates are obtained according to the following formula:

$$X_{01} = \frac{\Delta_1 * (Z1_1^2 - Z2_1^2)}{(Z1_1 - Z2_1)^2 + \Delta_1^2}$$

The data of the scanner A3 are suitable for determining the Y direction. The following formula holds for this coordinate direction:

$$Y_{03} = \frac{\Delta_3^2 * (Z1_3 - Z2_3)}{(Z1_3 - Z2_3)^2 + \Delta_3^2}$$

The data of the scanners A1 or A2 are relevant for determining the Z direction. The formula of calculation for the scanner A1 reads:

$$Z_{01} = \frac{\Delta_1^2 * (Z1_1 + Z2_1)}{(Z1_1 - Z2_1)^2 + \Delta_1^2}$$

Whereas for the parallel alignment of positioning body and reference body the distances are equal, there are differences at an angle of rotation $\omega$. Thus, the angle of rotation $\omega$ can be determined from the difference of the distances and the distance of the scanners according to the following formula:

$$\omega = \arctan \frac{Z_{02} - Z_{01}}{\delta_{21}}$$

The angle of rotation $\eta$ is determined by way of the difference of the data of the scanners A1 and A2 in the X direction, taking their reciprocal distances into consideration, according to the following formula:

$$\eta = \arctan \frac{X_{02} - X_{01}}{\delta_{21}}$$

Finally, the angle of rotation $\phi$ is calculated as follows:

$$\phi = \arctan \frac{X'_{M1} - X_{H1}}{c_1} - \arctan \frac{M_{M1} - X_{01}}{Z_{01}}$$

The method of calculation described in the given formulas corresponds to the first alternative described here. However, it is also possible to implement the second alternative, thus the calculation according to the projective relationship.

I claim:

1. A process to determine the position of a positioning body relative to a reference body, wherein said positioning body includes a scale with marks of constant spacing therebetween and wherein said reference body includes a scanner with a projection area onto which said marks of said scale are projected and imaging optics, said process comprising the steps of:
   trigonometrically calculating coordinates of a projection center of said imaging optics from projection angles between said projection center and three marks, arranged on said scale, and from the constant spacing of said marks; and
   trigonometrically calculating a tilt angle of said positioning body with respect to said reference body, said tilt angle calculating step including
   determining coordinates of said projection center of said imaging optics,
   determining a closest distance of said projection center from said projection area of said scanner, and
   determining image coordinates of a perpendicular line base point of said projection center on said project area.

2. A process as claimed in claim 1, wherein the calculations is performed according to the following trigonometric functions and equations:

$$X_{0i} = \frac{\Delta_i * (Z1_i^2 - Z2_i^2)}{(Z1_i - Z2_i)^2 + \Delta_i^2}$$

$$Z_{0i} = \frac{\Delta_i^2 * (Z1_i - Z2_i)}{(Z1_i - Z2_i)^2 + \Delta_i^2}$$

$$\phi = \arctan \frac{X'_{Mi} - X_H}{c} - \arctan \frac{X_{Mi} - X_{0i}}{Z_{0i}}$$

wherein in the case of i scanners the index i stands for the ordinal number of the respective scanner, and $$\text{where } Z1_i = \frac{\Delta_i}{2 * \tan \alpha_i}$$

$$\text{and } Z2_i = \frac{\Delta_i}{2 * \tan \beta_i}$$

and wherein $\alpha$ denotes a projection angle between said projection center and first and second adjacent marks of said scale, $\beta$ denotes a projection angle between said projection center and said first or said second mark and a third adjacent mark, $\Delta$ is the distance between two adjacent marks, $X_{Oi}$, $Z_{Oi}$ are coordinates of said projection center, denoted by index number relative to said scale, $\phi$ represents said tilt angle of said projection area of a scanner i relative to said scale, $X'_H$ denotes an image coordinate of said perpendicular line base point of said projection center on said projection area, $X_M$ denotes an X coordinate of a mink on said scale, $X'_M$ denotes an image coordinate of said mark $X_M$ on said projection area; and c is a constant representing a distance between said perpendicular line base point of said projection area of said scanner i and said projection center.

3. A process as claimed in claim 1, wherein two parallel scales, which lie in one plane, are scanned by two scanners, each scanner assigned to a respective one of said scales.

4. A process as claimed in claim 1, wherein two scales, which are positioned in orthogonal planes, are scanned by two scanners, each scanner assigned to a respective one of said scales.

5. A process as claimed in claim 1, wherein three scales, of which two lie in one plane and a third which is in a plane orthogonal to said one plane, are scanned by three scanners, each scanner assigned to a respective one of said scales.

6. A process as claimed in claim 5, where coordinates and angle of rotation of said positioning body with respect to said reference body are calculated according to the following functions and equations:

$$X_{01} = \frac{\Delta_1 * (Z1_1^2 - Z2_1^2)}{(Z1_1 - Z2_1)^2 + \Delta_1^2}$$

$$X_{02} = \frac{\Delta_2 * (Z1_2^2 - Z2_2^2)}{(Z1_2 - Z2_2)^2 + \Delta_2^2}$$

$$Y_{03} = \frac{\Delta_3^2 * (Z1_3 - Z2_3)}{(Z1_3 - Z2_3)^2 + \Delta_3^2}$$

$$Z_{01} = \frac{\Delta_1^2 * (Z1_1 - Z2_1)}{(Z1_1 - Z2_1)^2 + \Delta_1^2}$$

$$Z_{02} = \frac{\Delta_2^2 * (Z1_2 - Z2_2)}{(Z1_2 - Z2_2)^2 + \Delta_2^2}$$

$$\phi = \arctan \frac{M'_{Mi1} - X_{H1}}{c_1} - \arctan \frac{M_{Mi1} - X_{01}}{Z_{01}}$$

$$\eta = \arctan \frac{M'_{Mi3} - X_{H3}}{c_3} - \arctan \frac{M_{Mi3} - X_{03}}{Z_{03}}$$

or $$\eta = \arctan \frac{X_{02} - X_{01}}{\delta_{21}}$$

$$\omega = \arctan \frac{Z_{02} - Z_{01}}{\delta_{21}}$$

where the indices 1, 2, 3 stand for the first, second and third scanner, and $$\text{where } Z_{1\ldots3} = \frac{\Delta_{1\ldots3}}{2 * \tan \alpha_{1\ldots3}}$$

and $$\text{where } Z2_{1\ldots3} = \frac{\Delta_{1\ldots3}}{2 * \tan \beta_{1\ldots3}}$$

wherein $\alpha$ denotes a projection angle between said projection center and a first and a second adjacent mark, $\beta$ denotes a projection angle between said projection center and said first or second mark and a third adjacent mark, $\Delta$ is a distance between two adjacent marks, $X_{01}$, $X_{02}$, $Y_{03}$, $Z_{01}$ and $Z_{02}$ are coordinates of projection centers of said scanners, noted by indices, relative to said scales, $\theta$ represents an angle of rotation around the Y axis, $\phi$ represents an angle of rotation around the Z axis, $\omega$ represents an angle of rotation around the X axis, $\delta$ represents a distance between projection centers of said scanners noted by indices.

7. A process as claimed in claim 1, wherein, when said scale is an incremental scale, coordinates coaxial to said scale are determined by counting marks detected during scanning.

8. A process as claimed in claim 1, wherein, when the scale is an absolute scale, coordinates coaxial to said scale are determined by decoding coordinate information encoded in said marks.

9. A process to determine the position of a positioning body relative to a reference body, wherein said positioning body includes a scale with marks of constant spacing and said reference body includes a scanner with a projection area, onto which said marks of said scale are projected, and imaging optics, said process comprising the steps of:
trigonometrically calculating coordinates of said projection center of said imaging optics by evaluating at least three marks arranged on said scale; and
calculating a tilt angle of said positioning body with respect to said reference body, said tilt angle calculating step performed by way of a projective relationship between a projection plane of said scanner and a plane of said scale.

10. A process as claimed in claim 9, wherein said calculating steps are performed according to the following functions and equations:

$$\phi = \arctan(c * (a_3/a_1))$$

$$X_{01} = \frac{a_2 + c * \tan \phi}{a_1 * (1 + \tan^2 \phi)}$$

$$Z_{0i} = (c/a_1) + X_0 * \tan \phi$$

wherein in the case of i scanners the index i stands for the ordinal number of the respective scanner, $X_{Oi}$, $Z_{Oi}$ are the coordinates of said projection center of said scanner, noted by the index, with respect to the scale, $\phi$ represents said tilt angle of said projection area of the scanner i with respect to said scale, and $a_1$, $a_2$, and $a_3$ represent transformation constants calculated from an image of at least three marks $X_{M1}$, $X_{M2}$, $X_{M3}$ of said scale on said projection area of said scanner in the form of $X'_{M1}$, $X'_{M2}$ and $X'_{M3}$ by means of a solution of the equation:

$$X'_{Mj} = \frac{a_1 * X_{Mj} + a_2}{a_3 * X_{Mj} + 1}$$

where j stands for the ordinal number of said marks which are arranged on said scanner and whose coordinates are inserted into the equation, and c is a constant representing the closest distance between said projection area of said scanner and said projection center.

11. A device comprising:
a computer;
at least one scanner connected to said computer;
a positioning body including at least one scale with marks of constant spacing;
a reference body supporting said at least one scanner;
imaging optics for projecting said at least one scale of said positioning body onto a projection area of said at least one scanner;
a measuring device assigned to said at least one scanner, for determining projection angles between a projection center of said imaging optics and three marks which are arranged on said at least one scale;
wherein said computer trigonometrically calculates coordinates of said projection center from said projection angles between said projection center and said three marks, arranged on said at least one scale, and from said constant spacing of the marks and additionally a tilt angle of the positioning body with respect to the reference body by determining coordinates of said projection center, determining the distance between said projection center and said projection area of said at least one scanner, and by determining image coordinates of a perpendicular line base point of said projection center on said projection area.

12. A device as claimed in claim 1, wherein said scanner is connected to a computer and calculates said tilt angle $\phi$ of the positioning body with respect to said reference body by way of a projective relationship between a projection plane of the scanner and a plane of said scale.

13. A device as claimed in claim 1, further comprising two parallel scales which lie in one plane and are arranged on said positioning body and wherein a scanner is assigned to each scale.

14. A device as claimed in claim 1, further comprising two parallel scales, which lie in orthogonal planes and are arranged on the positioning body and wherein a scanner is assigned to each scale.

15. A device as claimed in claim 1, further comprising three scales, two of which lie in one plane and a third lies in a plane orthogonal to said one plane and are arranged on the positioning body and wherein a scanner is assigned to each scale.

16. A device as claimed in claim 1, wherein said scales are incremental scales, and the coordinates points in the direction of the scale are determined by a mark counter.

17. A device as claimed in claim 1, wherein said scales are absolute scales, and the coordinates points in the direction of the scale are determined by a decoder that decodes coordinates encoded in said marks.

* * * * *

UNITED STATES PATENT AND TRADEMARK OFFICE
CERTIFICATE OF CORRECTION

PATENT NO. : 5,404,226
DATED : April 4, 1995
INVENTOR(S) : HELMUT KELLNER

It is certified that error appears in the above-indentified patent and that said Letters Patent is hereby corrected as shown below:

On the title page,
Under [86] the information should read as follows.

§ 371 Date: Sept. 29, 1993
§ 102(e) Date: Sept. 29, 1993

Signed and Sealed this

Sixth Day of June, 1995

Attest:

BRUCE LEHMAN

*Attesting Officer*  *Commissioner of Patents and Trademarks*